May 11, 1937. F. E. BARTELL 2,079,591
TEXTILE TESTING MACHINE
Filed March 15, 1935
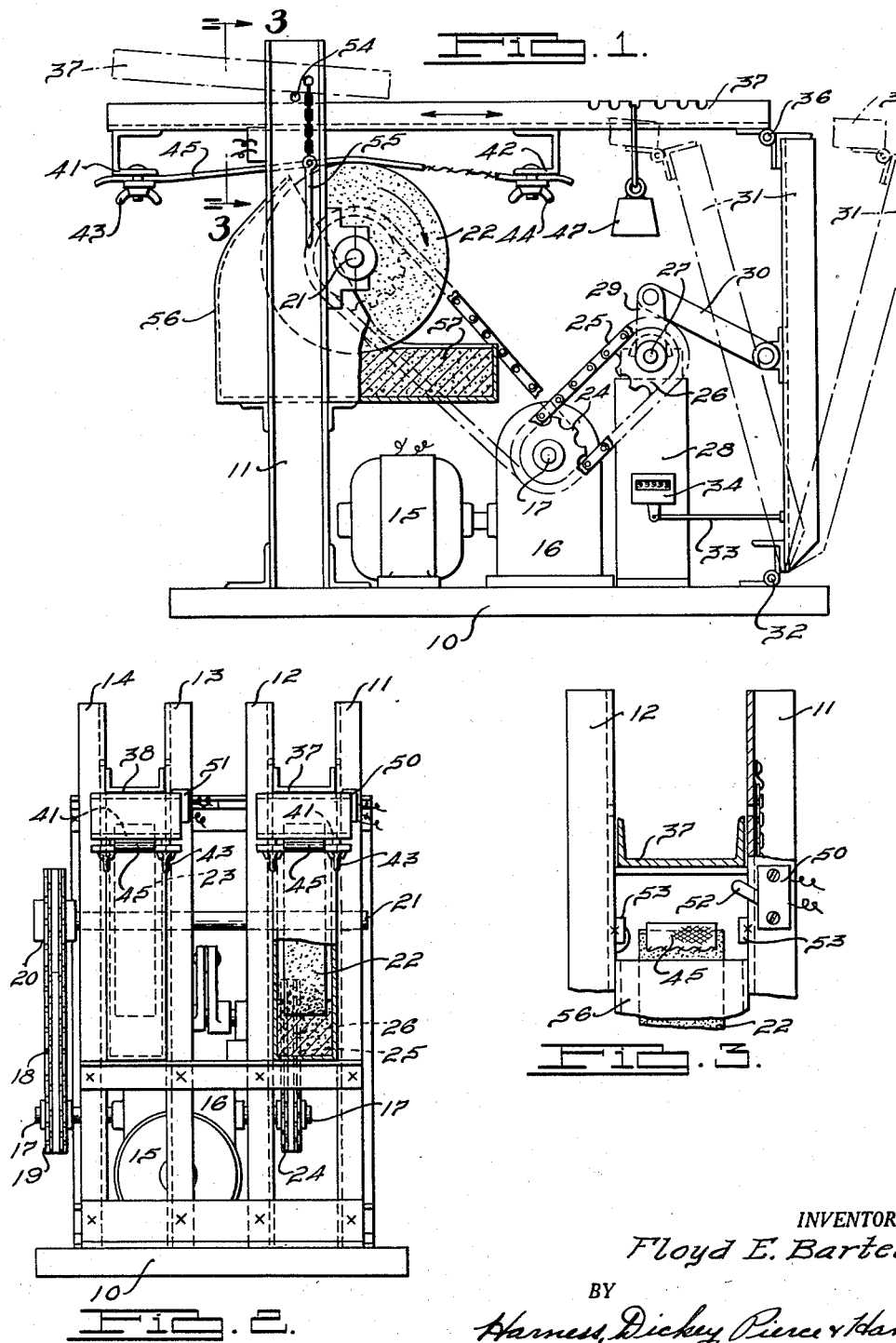
INVENTOR.
Floyd E. Bartell.
BY
Harness, Dickey, Pierce & Hann.
ATTORNEYS.

Patented May 11, 1937

2,079,591

UNITED STATES PATENT OFFICE 2,079,591

TEXTILE TESTING MACHINE

Floyd E. Bartell, Ann Arbor, Mich.

Application March 15, 1935, Serial No. 11,247

10 Claims. (Cl. 73—51)

The invention relates to testing equipment and it has particular relation to a machine for testing the wearing qualities of textiles.

In the textile industry it is important that manufacturers and others have some means of determining the wearing qualities of fabrics and particularly the comparative wearing qualities of different fabrics. If the wearing qualities of fabrics can be determined in a fairly accurate manner, one measure as to the value of fabrics is provided, and furthermore those interested in providing increased wearing qualities may determine more accurately lines of development to be followed. While it is not new, in general, to test the wearing qualities of fabrics, it has been difficult to determine such wearing qualities in a manner which can constantly be relied upon and one reason for this is that the wear creating means would lose some of its efficiency due to a collection of worn away material or to a premature deterioration of the wear creating means or to a combination of such factors, that prevented a uniformity of action necessary to secure accurate results. Uniformity of action in the use of means for creating wear on a fabric or plurality of fabrics for comparative purposes is of special value if an accurate measure, and particularly a comparative measure, is to be reliable.

One object of the present invention is to provide a testing machine particularly adapted for testing textiles, which will operate more efficiently and particularly in a constantly efficient manner so as to provide a truer test of the wearing qualities of a fabric and particularly a truer test of the comparative wearing qualities of different fabrics.

Another object of the invention is to provide a testing machine particularly adapted for testing textiles, which enables obtaining a more satisfactory wearing action on the fabric.

Another object of the invention is to provide a testing machine adapted particularly to test the wearing qualities of textiles, wherein the wearing action is accentuated as compared to the time required for testing fabrics by means of previously known testing equipment.

Another object of the invention is to provide a machine for testing the wearing qualities of a plurality of strips of fabric simultaneously, wherein the wearing qualities of any piece may be positively determined even though the different strips are worn through at different times.

For a better understanding of the invention, reference may be had to the accompanying drawing, illustrating one form of the invention wherein:

Figure 1 is a side elevational view of a textile testing machine constructed to one form of the invention, Fig. 2 is an end elevational view of the construction shown in Fig. 1, Fig. 3 is a cross-sectional view on a larger scale taken substantially along the line 3—3 of Fig. 1.

Referring to Figs. 1 and 2, the machine illustrated comprises a base 10 which has a plurality of vertical standards indicated at 11, 12, 13 and 14 projecting upwardly from one end of the base. A motor 15 mounted on the base is connected to a reduction gearing 16 having a projecting shaft 17, and, as shown by Fig. 2, a chain 18 is trained about a sprocket wheel 19 on the left end of the shaft and about a sprocket wheel 20 on a shaft 21 journaled in bearings supported on the previously mentioned standards. Abrasive wheels, such as emery or carborundum wheel, indicated at 22 and 23, are mounted on the shaft 21 between the standards 11 and 12 and between the standards 13 and 14, respectively.

The other end of shaft 17 is provided with a sprocket wheel 24 about which a chain 25 is trained and the latter in turn is trained about a sprocket wheel 26 provided on a shaft 27 journaled in bearings on an upright 28 also projecting upwardly from the base 10. A crank arm 29 connected to the shaft 27 has its outer end pivotally connected to a link 30 that in turn is pivotally connected at its opposite end to an upwardly extending standard 31. The standard 31 at its lower end is pivoted on the base 10, as indicated at 32, so as to oscillate in the plane of rotation of the wheels 22 and 23, and it will be apparent when the motor is operated, that the crank arm 29 and link 30 cause oscillatory motion of the standard 31. It may be mentioned in this connection that the standard 31 is provided with a rod 33 that is operatively connected to a counting device 34 of conventional construction which registers the number of oscillations of the standard during this operation.

The standard 31 at its upper end is pivotally connected, as indicated at 36, to horizontally extending bars 37 and 38, and these bars, as shown by Fig. 2, project respectively between the standards 11 and 12 and the standards 13 and 14 and are movable between said standards. Each of the bars 37 and 38, as best shown by Fig. 1, is provided with spaced horizontally disposed flanges 41 and 42 and clamping means 43 and 44 connected to said flanges are adapted to clamp the ends of a strip of fabric 45 between them. Normally, the fabric strip will be tensioned somewhat before its ends are clamped against the flanges and the horizontal position of the flanges facilitates the clamping and tensioning procedure. The left ends of the bars 37 and 38 are free to move downwardly by gravity and this causes the strips of fabric to engage the respective abrasive wheels and if it is found desirable to increase or vary the force of engagement between the fabric and the wheel, weights 47 may be suspended from and variably positioned on the bars so as to vary the force of engagement between the fabric and the wheels.

If the motor 15 now should be operated, the wheels 22 and 23 will rotate in the direction indicated while the bars 37 and 38 and the strips of fabric 45, will reciprocate horizontally over the wheels during which the fabric will be forcefully held in engagement with the wheels by the bars 37 and 38 and weights 47. The relation of parts is such that the linear speed of movement of the strips of fabric 45 is greater than the peripheral speed of movement of the wheels and it follows that an abrasive action will occur between the wheels and the fabric even when the fabric is moving to the right and the wheels are moving clockwise. A greater abrasive action will occur when the fabric is moving to the left, as then the movement of the fabric is opposite to the movement of the wheels. It may be mentioned in this connection that the sprocket wheel 20 on the wheel shaft 21 is larger than the other sprocket wheels so as to reduce the rotary speed of the wheels as compared to the rotary speed of the shaft 27, although this particular construction is mentioned only to show more definitely that the peripheral speed of the wheels 22 and 23 is less than the linear speed of the bars 37 and 38 and, consequently, of the strips of fabric. This result might be accomplished in various ways, such as by varying the dimensions of sprocket wheels 19, 24 and 26 or by having a reduction gearing provided with a slowly driven shaft connected to the shaft 21 and a more rapidly driven shaft connected to shaft 27.

For stopping the motor when either strip of fabric 45 is worn through, electric circuit breakers 50 and 51 in the motor circuit are provided on the standards 11 and 13, so that if either is opened, the motor circuit will be broken. As more particularly shown by Fig. 3, each circuit breaker may comprise a movable arm 52, projecting into the path of movement one of the bars 37 and 38, so that when either bar moves downwardly upon breaking of the fabric, the switch is opened to break the motor circuit. In the event one of the fabric strips becomes worn through and the bar 37 or bar 38 falls, it may be prevented from engaging the emery wheel by means of lugs 53 secured to the standards. In order that the testing operation may be continued on the other strip of fabric in the event one strip breaks, the standards may be provided with openings 54, as shown by Fig. 1, and a pin 55 may be inserted through such openings and under the released bar so as to slidably hold the latter in its normally operative position. Upon the breaking of one strip, the counter device 34 may be noted and the notation recorded, then the bar to which the broken strip was secured may be raised, the pin 55 then inserted and the switch then returned to its operative position so that the test may be continued. It may be mentioned at this time that any number of strips may be tested by providing additional standards, bars 37 and 38, and abrasive wheels, but it seems sufficient here to illustrate only two.

For the purpose of cleaning the abrasive wheels and at the same time accentuating the abrasive action on the fabric, a receptacle 56 having sand 57 therein is provided between each pair of the standards and the emery wheel between said standards partially projects into the receptacle. It will be noted that the receptacle projects to the right of the wheel so that any sand carried around and over the wheel may fall back into the receptacle, and that at its left side, the receptacle has an end wall converging upwardly to a point adjacent the top of the wheel. During rotation of the wheel, its abrasive surface moves through the sand and this naturally cleans particles of lint and other foreign matter from between the particles of abrasive on the wheel and prevents an increasing collection of such matter on the wheel surface that tends to cover the abrasive particles on the wheels and to prevent an abrasive action. Furthermore, certain particles of the sand are carried upwardly between the end wall of the receptacle and the wheel and become deposited on the roughened surface of the wheel, and such sand particles are carried between the fabric and the wheel and this accentuates the abrasive action. Primarily, however, it is important that the abrasive wheel be kept clean and free from a collection of lint and other foreign matter so that it has a constantly uniform action on the fabric. Furthermore, it insures that fabrics subsequently tested on the wheels are subjected to substantially the same test as the fabrics previously tested. From this, it will be apparent that during testing of strips of fabric, the wheels will exert a constantly efficient and uniform wearing action on the fabric throughout the tests and thus avoid variations that would not provide a favorable comparison between different strips of fabric.

It may be added further that the sand in passing between the wheel and fabric so acts on the latter as to produce an effect simulating ordinary internal wear such as that produced as a result of internal friction, dirt within the fabric, etc. It will be understood that in this action sand particles, or at least some of them, will lodge in the fabric, at least temporarily, and that the movement of these particles in and out necessarily will have a wearing effect on the thread particles.

Although only one form of the invention has been illustrated and described in detail, it will be apparent to those skilled in the art that various modifications may be made without departing from the scope of the appended claims.

I claim:

1. A machine for testing fabrics comprising spaced means for holding a strip of the fabric so that the fabric between such means may engage and conform to the periphery of an abrasive wheel, a rotary abrasive wheel for engaging the strip, means for holding a part of the strip between said spaced means against the wheel periphery, means for rotating the wheel, and means for directing finely divided abrasive solids to the wheel periphery adjacent its engagement with the fabric and over the portion of the wheel turning into the fabric, so as to cause some of the solids to be carried between the fabric and the portion of the wheel engaging it and to accentuate the abrasive action of the wheel.

2. A machine for testing fabrics comprising spaced means for holding a strip of the fabric, a rotary abrasive wheel for engaging the strip, means for holding a part of the strip against the wheel periphery, means for rotating the wheel, and a receptacle receiving the wheel at the side of the latter opposite the fabric and adapted to contain finely divided abrasive particles for the wheel to turn through so as to clean the abrasive surface of the latter, said receptacle at that side of the wheel turning into engagement with the fabric having end and side walls projecting to a point adjacent the area of engagement, with the end wall also converging towards the wheel so as to define a reduced passage tending to hold the abrasive particles on the wheel periphery until the latter substantially reaches the fabric engaging point.

3. A machine for testing fabrics comprising spaced means for holding a strip of the fabric, a rotary abrasive wheel for engaging the strip, means for holding a part of the strip against the wheel periphery, means for rotating the wheel, and a receptacle receiving the wheel at the side thereof opposite the fabric and adapted to contain a mass of finely divided abrasive particles for the wheel to turn through so as to clean the abrasive surface of the latter, said receptacle at that side of the wheel turning into the fabric having a portion converging to a point adjacent the fabric engagement and in close proximity to the wheel surface so as to cause some of the particles to be carried on the wheel and between it and the fabric so as to accentuate the abrasive action, and having a projecting portion at the side of the wheel turning away from the fabric and adapted to catch the abrasive particles that pass between the fabric and wheel.

4. The method of testing the wearing qualities of fabric or the like, which comprises holding a strip of the material against a portion of the periphery of a rotary abrasive wheel, rotating the wheel while reciprocating the strip over the wheel, directing the wheel through a mass of finely divided abrasive particles so as to clean it and remove worn particles of the material from the abrasive surface of the wheel, and directing some of such abrasive particles over the wheel surface as it turns into engagement with the material so as to cause some of the abrasive particles to pass between the material and wheel so as to accentuate the abrasive action on the material.

5. A machine for testing fabrics comprising means for holding and reciprocating a strip of fabric, a vertically arranged rotary abrasive wheel substantially in the plane of reciprocation of the strip and having a hard abrasive surface, means for holding the strip against the wheel and with a substantial length of the strip in curved contact with the wheel periphery, means for rotating the wheel, and means cooperating with the rotation of the wheel for feeding loose and finely divided abrasive solids in definite and regular amounts between the fabric and that part of the wheel periphery engaging the fabric.

6. A machine for testing fabrics comprising means for holding and reciprocating a strip of fabric, a vertically arranged rotary abrasive wheel substantially in the plane of reciprocation of the strip and having a hard abrasive surface, means for holding the strip against the wheel and with a substantial length of the strip in curved contact with the wheel periphery, means for rotating the wheel, and means cooperating with the rotation of the wheel for feeding loose and finely divided abrasive solids in definite and regular amounts between the fabric and that part of the wheel periphery engaging the fabric, said last means comprising a receptacle having the loose abrasive solids therein and through which the wheel turns and having an end wall portion extending over the wheel periphery in close relation thereto so as to assist in the holding of said solids on the wheel periphery for passage between the fabric and wheel.

7. The method of testing the wear qualities of fabric which comprises reciprocating a strip of the fabric over a portion of a rotating abrasive wheel with the plane of reciprocation substantially in the plane of the wheel rotation, while simultaneously holding the strip in contact with a substantial extent of the curved wheel periphery, and feeding definite and regular amounts of loose, finely divided abrasive solids between the wheel periphery and fabric at that side of the wheel turning into engagement with the fabric, whereby the reciprocation of the fabric and the rotation of the wheel causes the solids to accentuate the abrasive action and to obtain a pronounced internal and external friction condition in the fabric as the solids are pressed into the fabric during the relative movement of the solids, fabric and wheel.

8. A machine for testing the wearing qualities of fabrics, comprising spaced means for holding a strip of fabric so that the latter between such means may engage and conform to the periphery of an abrasive wheel, a rotary abrasive wheel, means for rotating the wheel, means for holding the strip of fabric between the holding means against the wheel periphery, and means for directing and feeding small quantities of sand between the wheel periphery and that part of the fabric engaging it so as to effect an accentuation of the abrading action on the fabric and to produce internal as well as external wear on the fabric.

9. A machine for testing the wearing qualities of fabrics, comprising spaced means for holding a strip of fabric so that the latter between such means may engage and conform to the periphery of an abrasive wheel, a rotary abrasive wheel, and a receptacle containing sand and through which the wheel turns so that the sand cleanses the wheel of material worn from the fabric.

10. A machine for testing the wearing qualities of fabrics, comprising spaced means for holding a strip of fabric so that the latter between such means may engage and conform to the periphery of an abrasive wheel, a rotary abrasive wheel, a receptacle containing sand and through which the wheel turns so that the sand cleanses the wheel of material worn from the fabric, and means for directing and feeding small quantities of the sand between the wheel periphery and the fabric so as to accentuate the abrading action.

FLOYD E. BARTELL.